April 9, 1940.   W. H. FRECHTLING ET AL   2,196,857
ROTARY HOE WHEEL
Filed Jan. 21, 1938
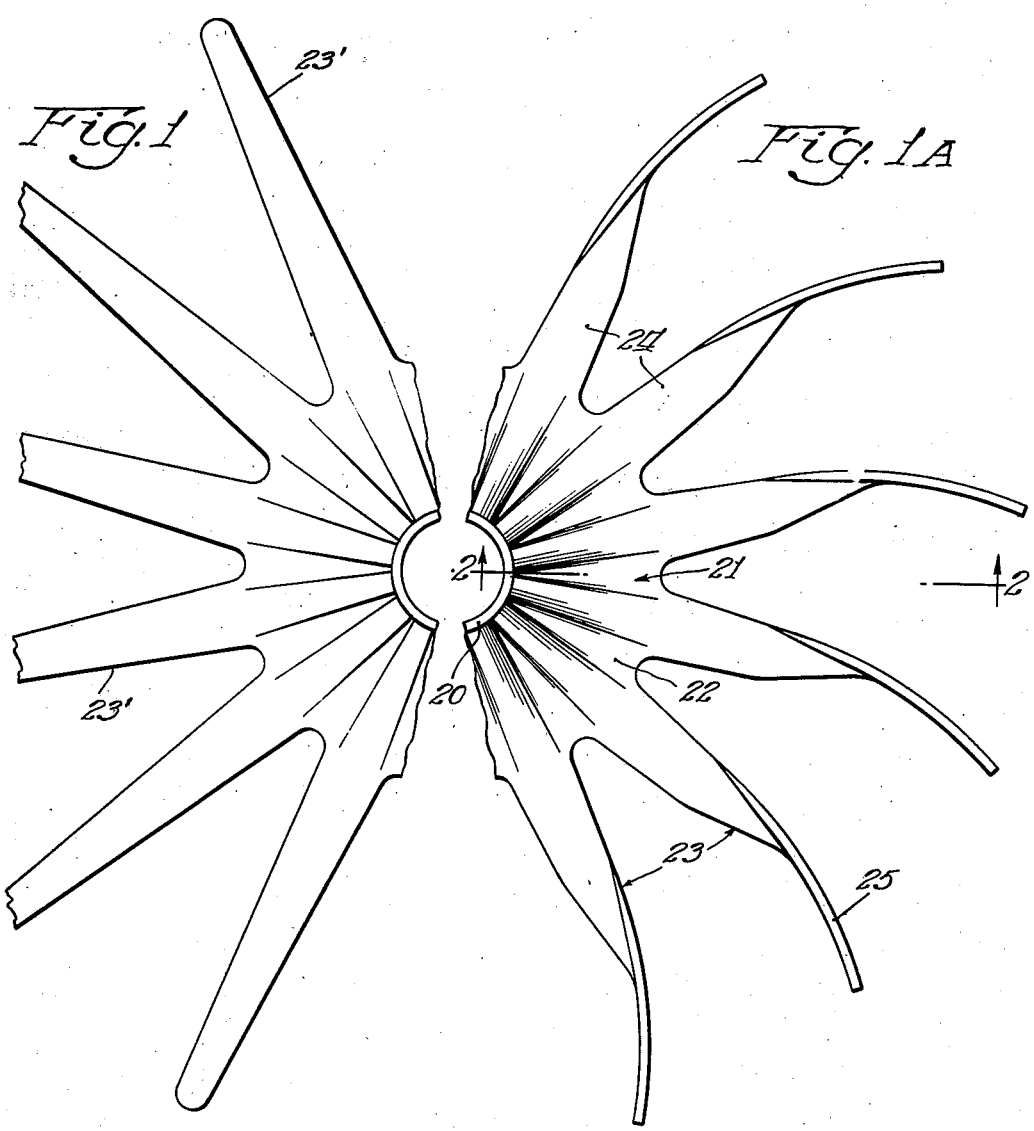
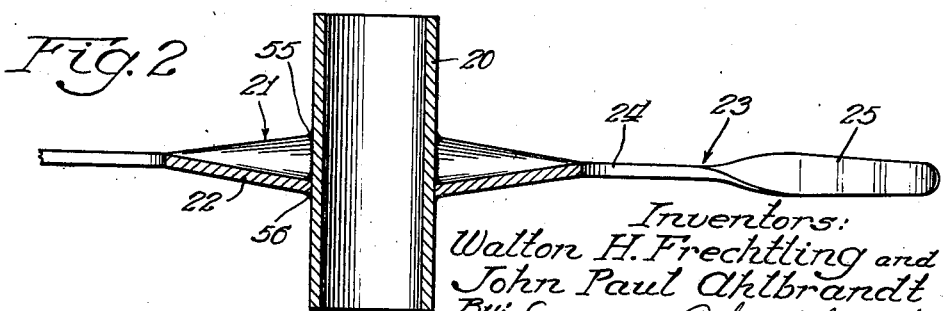

Patented Apr. 9, 1940

2,196,857

UNITED STATES PATENT OFFICE 2,196,857

ROTARY HOE WHEEL

Walton H. Frechtling and John Paul Ahlbrandt, Chicago, Ill., assignors to Borg-Warner Corporation, Chicago, Ill., a corporation of Illinois Application January 21, 1938, Serial No. 186,162

1 Claim. (Cl. 55—24)

This invention relates to hoe wheels and to a method and an apparatus by which such wheels can be made.

Hoe wheels as produced for commercial consumption at present are made of malleable cast iron, the malleability being a necessary quality to render the wheel yieldable under impact with hard and immovable objects. If the wheels were made of ordinary grey iron castings, similar impacts would break the teeth of the wheels and render them useless thereafter. A malleable wheel, though bent, will not break, and the quality which causes them to bend under impact likewise permits them to be straightened and made fit for further use.

Malleable castings, however, are expensive and the limits to which they can be bent without rupturing are relatively small. Furthermore, though it is better that the wheel bend than break, each bend requires a separate hand operation to restore the wheel to its original form.

The object of this invention is to provide an improved hoe wheel which is lighter and stronger than those heretofore made, and which possesses sufficient resiliency to withstand severe impacts and strains without sustaining permanent deformation.

Another object is to provide a hoe wheel which is superior to similar wheels made from malleable cast iron and is less expensive to make.

These and other objects of this invention will become apparent from the following description when taken together with the accompanying drawing which forms a part thereof and in which:

Fig. 1 is a fragmentary elevation of a partially formed novel hoe wheel;

Fig. 1A is a fragmentary elevation of a completely formed hoe wheel;

Fig. 2 is a section through the hoe wheel of Fig. 1A taken along line 2—2.

In its preferred form this invention comprises a hoe wheel made entirely of sheet steel instead of grey or malleable cast iron. Instead of tapering the thickness of the hoe wheel to get increased rigidity at the hub, the wheel is corrugated radially and the corrugated inner periphery is welded to a steel tube which forms the hub of the hoe wheel. The tips of the teeth are bent 90° to the plane of the wheel and are also curved in the direction of rotation.

Referring now to the drawing for a detailed description of the invention, a fragment of a partly formed hoe wheel is shown in Fig. 1 and a fragment of a completed wheel is shown in Fig. 1A. The wheel is comprised of a tubular hub 20 which is welded to a sheet steel toothed disc 21. Said disc 21 has a solid inner portion 22 which is corrugated radially to stiffen the disc axially. The thickness of the metal at the inner portion is constant radially outward. The outer portion is comprised of teeth 23 having a part 24 in the plane of the wheel and a part 25 which is twisted so as to be normal to the plane of the wheel. The teeth are tapered in width as shown at 23' in Fig. 1.

It will be noted that the twist in the teeth occurs at about one-half the length of the teeth. This gives a sufficiently long working surface and provides maximum strength in the direction of the application of force.

The twisted portion 25 of the teeth is curved in the direction of rotation of the wheel to give the proper turning effect to the soil as it is operated upon by the wheel.

The welding of the steel tube 20 is preferably done at points 55 and 56 around the tube, thus forming a circuitous line of contact between the tube and wheel. It will be noted that at these points an obtuse angle is formed between the corrugations and the tube. This permits the welding electrode (not shown) to approach the intersection of the surfaces more closely and makes for a more satisfactory weld.

A hoe wheel made in accordance with this invention requires no expensive foundry operations, and possesses a great deal of resilience which permits the wheel to be bent without suffering permanent deformation. The wheel is made entirely of sheet steel, using ordinary punch presses for its formation. The solid inner portion can be made rigid axially without the addition of metal and without altering the original thickness of the sheet steel.

It is understood that the foregoing description is merely illustrative of a preferred embodiment of the invention and that the scope of the invention accordingly is not to be limited thereto, but is to be determined by the appended claim.

We claim:

As a new article of manufacture a hoe-wheel made entirely of sheet steel and having a tubular hub, a solid corrugated inner portion welded to the tubular hub along the circuitous line of contact between said hub and said wheel, and curved teeth integral with the inner portion, the end regions of the teeth being bent substantially at right angles to the plane of the wheel.

WALTON H. FRECHTLING.
JOHN PAUL AHLBRANDT.